United States Patent
Wu et al.

(10) Patent No.: US 11,934,530 B2
(45) Date of Patent: Mar. 19, 2024

(54) SECURITY PROTECTION METHOD AND APPARATUS

(71) Applicant: ZTE Corporation, Shenzhen (CN)

(72) Inventors: Qiang Wu, Shenzhen (CN); Chunming Wu, Shenzhen (CN); Suan Ma, Shenzhen (CN); Hongxun Zhao, Shenzhen (CN); Yifei Qin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 892 days.

(21) Appl. No.: 16/960,587

(22) PCT Filed: Jan. 30, 2019

(86) PCT No.: PCT/CN2019/073841
§ 371 (c)(1),
(2) Date: Jul. 8, 2020

(87) PCT Pub. No.: WO2019/154202
PCT Pub. Date: Aug. 15, 2019

(65) Prior Publication Data
US 2020/0394315 A1    Dec. 17, 2020

(30) Foreign Application Priority Data
Feb. 9, 2018   (CN) .......................... 201810135941.4

(51) Int. Cl.
*G06F 21/57*   (2013.01)
*G06F 8/60*   (2018.01)
*G06F 8/71*   (2018.01)

(52) U.S. Cl.
CPC .............. *G06F 21/577* (2013.01); *G06F 8/60* (2013.01); *G06F 8/71* (2013.01); *G06F 21/572* (2013.01); *G06F 2221/033* (2013.01)

(58) Field of Classification Search
CPC . G06F 21/577; G06F 8/60; G06F 8/71; G06F 21/572; G06F 2221/033
See application file for complete search history.

(56) References Cited

U.S. PATENT DOCUMENTS

2006/0136867 A1* 6/2006 Schneider ............... G06F 21/14
717/136
2008/0046867 A1   2/2008 Anderson
(Continued)

FOREIGN PATENT DOCUMENTS

| CN | 107145376 A | 9/2017 | |
| CN | 107196803 A | 9/2017 | |
| WO | WO-2006066446 A1 * | 6/2006 | ......... G06F 9/44547 |

OTHER PUBLICATIONS

Michael Franz, "E unibus pluram: Massive-Scale Software Diversity as a Defense Mechanism", Oct. 20, 2021; URL: https://dl.acm.org.

(Continued)

*Primary Examiner* — Ayoub Alata
(74) *Attorney, Agent, or Firm* — CANTOR COLBURN LLP (57) ABSTRACT

Provided are a security protection method and apparatus. The security protection method includes: generating software versions based on diversity compilation, and constructing a software version pool using the software versions as heterogeneous functional equivalents; and dynamically deploying a software version on a network element according to the software version pool.

18 Claims, 3 Drawing Sheets

---

Generate software versions based on diversity compilation, and construct a software version pool using the software versions as heterogeneous functional equivalents — S110

Dynamically deploying a software version on a network element according to the software version pool — S120

(56) References Cited

U.S. PATENT DOCUMENTS

2009/0172821 A1 7/2009 Daira
2014/0033191 A1 1/2014 Ward

OTHER PUBLICATIONS

International Search Report for corresponding application PCT/CN2019/073841 filed Jan. 30, 2019; dated Apr. 25, 2019.
Dylan Clarke, "FORTRESS: Adding Intrusion-Resilience To Primary-Back-up Server Systems", 2021, 31st International Symposium on Reliable Distributed Systems.
European Search Report for corresponding application EP 19 75 1256; Report dated Mar. 4, 2021.
Jin B. Hong, "Optimal Network Reconfiguration for Software Defined Networks using Shuffle-based Online MTD", 2017, IEEE 36th Symposium on Reliable Distributed Systems.
Network Management Software, Wikipedia, Feb. 15, 2021.

\* cited by examiner

SECURITY PROTECTION METHOD AND APPARATUS

TECHNICAL FIELD

The present disclosure relates to the technical field of computer communications, and in particular, to a security protection method and apparatus.

BACKGROUND

In the field of communications and the field of virtualized cloud computing, each network element is composed of a software version and a hardware platform. The hardware platform mainly includes a dedicated hardware platform and a general-purpose server hardware platform. A cloud service system is mostly constructed by using software and hardware, and unknown vulnerabilities and uncertainty threats of backdoors cannot be avoided. In addition, software and hardware components of the cloud environment are homogenized, and therefore affecting ranges of the same vulnerability or backdoor are wider.

In related art, the software version of the same functional entity of the cloud service system keeps the same during stable running. Software version replacement is generally triggered in consideration of function expansion, performance expansion or system stability.

With the development of network intrusion technologies, software version replacement often lags behind network attack behaviors, and therefore a new software version management method is required in order to enhance the active defense capability of the cloud service system.

SUMMARY

The technical problem to be solved by the embodiments of the present disclosure is to provide a security protection method and apparatus, which can use software versions generated by diversity compilation as heterogeneous functional equivalents and dynamically deploy a software version of a scheduling and management network element, thereby implementing active protection independent of attack features in the system.

An embodiment of the present disclosure provides a security protection method, including:

generating software versions based on diversity compilation, and constructing a software version pool using the software versions as heterogeneous functional equivalents; and dynamically deploying a software version on a network element according to the software version pool.

An embodiment of the present disclosure provides a security protection apparatus, including:

a software version pool establishment module, configured to generate software versions based on diversity compilation, and construct a software version pool using the software versions as heterogeneous functional equivalents; and a software version deployment module, configured to dynamically deploy a software version on a network element according to the software version pool.

An embodiment of the present disclosure provides a security protection apparatus, including:

a memory, a processor and a security protection program which is stored on the memory and is able to be executed by the processor, and the security protection program, when being executed by the processor, implements operations of the above security protection method.

An embodiment of the present disclosure provides a computer readable storage medium, a security protection program is stored on the computer readable storage medium, and the security protection program, when being executed by a processor, implements operations of the above security protection method.

Compared with the related art, the embodiments of the present disclosure provides a security protection method and apparatus, which can use software versions generated by diversity compilation as heterogeneous functional equivalents and dynamically deploy a software version of a scheduling and management network element, thereby implementing active protection independent of attack features in the system.

DETAILED DESCRIPTION OF THE EMBODIMENTS

In order to make the objects, technical solutions and advantages of the present disclosure more apparent, the embodiments of the present disclosure will be described in detail below with reference to the accompanying drawings. It should be noted that the embodiments and the features in the embodiments of the present application may be combined with each other arbitrarily if no conflict is caused.

According to the mimic security defense principles based on heterogeneous redundancy, unknown security threats in a single cyberspace can be transformed into joint probability problems in a multi-dimensional heterogeneous cyberspace: unknown security threats (unknown vulnerabilities, unknown backdoors, etc.) in a single cyberspace appear as unknown and uncertain features. Unknown security threats in a single cyberspace can be placed in a multi-dimensional heterogeneous cyberspace, and multiple independent unknown events can be transformed into joint probability problem based on multi-selection decision or consistency decision. The mimic security defense principles based on heterogeneous redundancy propose that a plurality of executives with random, diverse and dynamic features appear as different results in the same attack path, and the output of the system is determined based on the multiple results through collective voting. The security of the system therefore does not depend on a single individual, but rather is jointly determined by a plurality of different isomers.

A compiler is a program that translates "one language (usually a high-level language)" into "another language (usually a low-level language)". The compiler serves as a main generation tool for the execution body of each layer, and is an effective tool for generating diverse execution bodies. The diversity compilation technology can realize the diversity of code generation policies and data arrangement forms for multi-layer protocol stack features of different functional software. With a runtime analysis technology, an instruction and control flow obfuscation technology, a code optimization technology and an executive heterogeneity evaluation technology, etc., execution bodies at different levels, such as an address space, a namespace, an instruction system, kernel data, and an executable file structure, with different heterogeneities can be efficiently constructed.

For key components such as cloud management, control and service, and uncertain threats brought by unknown vulnerabilities and backdoors in the base software and operating system, the embodiments of the present disclosure propose an idea of generating heterogeneous functional equivalents based on diversity compilation in consideration of an intra-security technology of a mimic security defense architecture. On this basis, the information service is integrated with the security protection. Dynamic deployment scheduling and management based on the security policy is performed on the software version of the network element to implement temporal and spatial dimension mimic transformation. When the cloud application and the infrastructure are attacked, this security protection scheme can function continuously, thereby implementing active protection independent of attack features.

First Example

Figure 1:
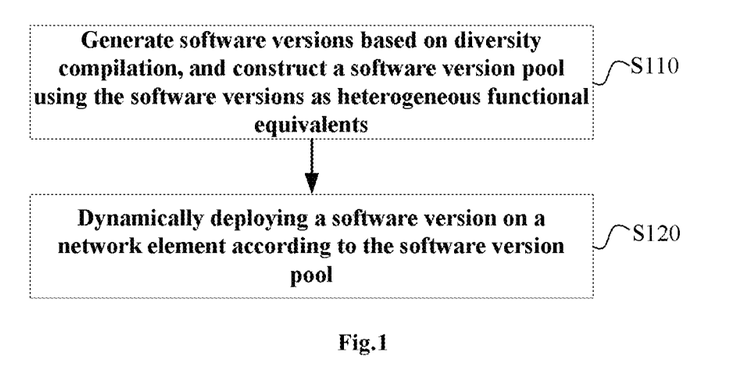
FIG. 1 is a flowchart of a security protection method according to a first embodiment of the present disclosure.

As shown in FIG. 1, an embodiment of the present disclosure provides a security protection method, including the following operations.

In operation S110, software versions are generated based on diversity compilation, and a software version pool is constructed using the software versions as heterogeneous functional equivalents;

In operation S120, a software version is dynamically deployed on a network element according to the software version pool.

In this embodiment, the heterogeneous functional equivalents refer to a set of functional components having the same function and different implementing structures. Differences in concepts, methods, tools, conditions, etc. for implementing functions may result in differences in the specific implementation method for the architecture for implementing functions, the algorithm selection or the method creation, and the structural design satisfying the function requirements. Thus, the same function may generally be implemented based on a plurality of implementation structures presenting differences in the following aspects: global symbol (global variables, functions, etc.) layout differences, key data structure layout differences, address space (code segment, data segment, BSS (Block Started by Symbol)) variation differences and the like.

The heterogeneous functional equivalents may include: a plurality of software versions generated based on a homology code by using the diversity compilation; and/or a plurality of software versions generated based on a heterologous code by using the diversity compilation.

The diversity compilation is to retrofit the existing operating system, inject security features (dynamics, randomness, and diversity) to change the system laws upon which the attack process depends, and generate a plurality of variants (equivalents) with random and diversity features through a compiler, so that possible attack paths also have random and diversity features. For multi-layer protocol stack features of different functional software, diversified code generation policies and data arrangement forms are implemented. With the runtime analysis technology, the instruction and control flow obfuscation technology, the code optimization technology and the executive heterogeneity evaluation technology, etc., execution bodies at different levels, such as an address space, a namespace, an instruction system, kernel data, and an executable file structure, with different heterogeneities can be efficiently constructed. Due to the dependency of the attack means on the environment, after the homologous or heterologous codes are compiled diversely, their different structures can, at least to some extent, realize security gain for attack means such as vulnerabilities and Trojan.

In an implementation, the software versions in the software version pool include the following management attributes: a software function version management attribute and a heterogeneous functional equivalent version management attribute.

The software function version management attribute includes a software function version number which is used for marking a logical function difference between software versions.

The heterogeneous functional equivalent version management attribute includes a diversity compilation version number which is used for marking a difference in results of software version diversity compilation. Software versions having different heterogeneous functional equivalent version management attributes are marked with different version numbers.

In one embodiment, the method further includes the following operation.

A software version mapping table is established. The software version mapping table records a correspondence between the diversity compilation version number of each software version used as a heterogeneous functional equivalent and a network element identifier.

The network element identifier includes at least one of the following: an IP address of the network element, a host identifier of the network element, and a logical identifier of the network element.

In an implementation, the operation of dynamically deploying the software version on the network element according to the software version pool includes:
  when the network element is initially generated, one software version is selected from the software version pool randomly or based on a security policy, and the selected software version is deployed onto a physical resource of the network element; and/or
  when the network element is subjected to elastic capacity expansion, one software version is selected from the software version pool randomly or based on a security policy, and the selected software version is deployed onto the capacity-expended physical resource of the network element; and/or
  during system operation, services are migrated from a first network element to a second network element according to a security policy, a first software version in the software version pool is deployed on the first network element, and a second software version in the software version pool is deployed on the second network element, wherein the first software version and the second software version correspond to a same software function but different compiled versions; and/or during system operation, the software version on the network element is changed periodically or according to the security policy, wherein the software version after the change is selected from the software version pool randomly or based on the security policy, and the software version before the change and the software version after the change correspond to the same software function but different compiled versions.

Software versions (V1, V2, V3 . . . Vn) generated based on the diversity compilation technology serve as heterogeneous functional equivalents and constitute a software version pool. The attack paths for software versions subjected to random and diversified compilation also have random and diverse features. For example, when different network elements load software versions with different compilation versions, dynamic deployment scheduling and management based on a security policy can implement temporal and spatial dimension mimic transformation to transform an unknown security problem and a deterministic attack result caused by a backdoor or a vulnerability in a single cyberspace into a probability problem in a multi-dimensional cyberspace, so that the probability of being attacked can be reduced.

The software versions in the software version pool have a heterogeneous functional equivalent version management attribute in addition to basic management attributes based on features such as function, performance and stability. Software versions having different heterogeneous functional equivalent version management attributes are marked by different version numbers. A software function version number and a diversity compilation version number are assigned to a software version, wherein the software function version number is used for marking a logical function difference between software versions, and the diversity compilation version number is used for marking a difference in results of software version diversity compilation. The same software function version number may correspond to one or more diversity compilation version numbers, and the same diversity compilation version number can only correspond to one software function version number.

A software version manager centrally manages the software version pool and maintains a software version mapping table. The software version mapping table records a correspondence between the software version number of each software version used as a heterogeneous functional equivalent and the network element identifier. The network element identifier includes at least one of the following: an IP address of the network element, a host identifier of the network element, and a logical identifier of the network element.

When the system is initialized, the software version manager pre-installs a required software version, and allocates the software function version number Fm and the diversity compilation version number Vm for the software version. In the service process, the service network element submits a version deployment request to the software version manager, and the software version manager allocates a diversity compilation version number to the service network element based on the security policy. After the version is loaded successfully, the software version manager records the correspondence between the diversity compilation version number and the network element identifier, and marks a usage state of the software version as being used. As shown in Table 1 below, the software version manager records the correspondence between the software function version number, the diversity compilation version number and the network element identifier, and records the usage state of the software version on the network element. If the software version is loaded successfully on the network element, the usage state is "Y", and if the software version is not loaded or the loading fails on the network element, the usage state is "N".

TABLE 1

| Software function version number | Diversity compilation version number | Network element identifier | Usage state (Y or N) |
|---|---|---|---|
| F1 | V1 | NE1 | Y |
| F2 | V2 | NE2 | N |
| . . . | . . . | . . . | . . . |
| Fm | Vm | NEm | Y |

Dynamic deployment scheduling and management may be performed on the software versions based on the security policy to implement temporal and spatial dimension mimic transformation. On the one hand, in a virtualized cloud service system, based on a security policy, the same Virtualized Network Function (VNF for short) may be implemented by executing different diversity compiled versions on different virtual machines. Through service migration, the service process can run in different diversity compiled versions, thereby implementing mimic transformation of spatial dimension. For example, a Virtual Private Network (VPN for short) connects to a service stream Service1, and the service processing is initially performed by a diversity compiled version Vm. A Virtualized Network Function Manager (VNFM for short) may dynamically migrate the service flow Service1 connected to the VPN to another diversity compiled version Vj based on a security policy to perform service processing. Due to the difference in the diversity compiled version Vm and Vj, the attack paths of the backdoors and the vulnerabilities are also different. In addition, due to the change of the execution conditions upon which the backdoors and the vulnerabilities are dependent, the attack effects of the backdoors and the vulnerabilities are also different, thereby realizing the mimic transformation and the active migration of the spatial dimension. On the other hand, in the virtualized cloud service system, based on the security policy, the VNFM can regularly start the software version changing process for a certain VNF. The deployment of the software version is completed by the software version manager and a specific network element. For the same VNF, although the function of the VNF maintains the same in the time dimension, different compiled versions are executed in different time periods, the attack paths of the backdoors and the vulnerabilities are different. In addition, due to the change of the execution conditions of the backdoors and the vulnerabilities, the attacking effects are different, thereby realizing the mimic transformation and the active migration of the time dimension.

Second Example

Figure 2:
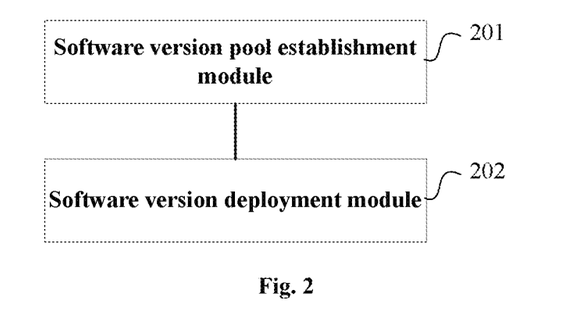
FIG. 2 is a schematic diagram of a security protection apparatus according to a second embodiment of the present disclosure.

As shown in FIG. 2, an embodiment of the present disclosure provides a security protection apparatus, including:
    a software version pool establishment module 201, configured to generate software versions based on diversity compilation, and construct a software version pool using the software versions as heterogeneous functional equivalents; and a software version deployment module 202 is configured to dynamically deploy a software version on a network element according to the software version pool.

In one implementation, the software versions in the software version pool include the following version attributes: a software function version attribute and a diversity compilation version attribute, wherein the software function version attribute is used to mark a logical function difference between software versions, and the diversity compilation version attribute is used to mark a difference in results of the diversity compilation.

The heterogeneous functional equivalents may include: a plurality of software versions generated based on a homology code by using the diversity compilation; and/or a plurality of software versions generated based on a heterologous code by using the diversity compilation.

In an embodiment, the software version pool establishment module is further configured to establish a software version mapping table, wherein the software version mapping table records a correspondence between version attributes of each software version used as a heterogeneous functional equivalent and a network element on which the software version is deployed.

In an implementation, the software version deployment module is configured to dynamically deploy the software version on the network element according to the software version pool in a following manner: when the network element is initially generated, selecting one software version from the software version pool randomly or based on a security policy, and deploying the selected software version onto a physical resource of the network element.

In an implementation, the software version deployment module is further configured to dynamically deploy the software version on the network element according to the software version pool in a following manner: when the network element is subjected to elastic capacity expansion, selecting one software version from the software version pool randomly or based on a security policy, and deploying the selected software version onto the capacity-expended physical resource of the network element; and/or during system operation, migrating services from a first network element to a second network element according to a security policy, deploying a first software version in the software version pool on the first network element, and deploying a second software version in the software version pool on the second network element, wherein the first software version and the second software version correspond to a same software function but different compiled versions; and/or during system operation, changing the software version on the network element periodically or according to the security policy, wherein the software version after the change is selected from the software version pool randomly or based on the security policy, and the software version before the change and the software version after the change correspond to the same software function but different compiled versions.

In this embodiment, software versions (V1, V2, V3, . . . , Vn) generated based on the diversity compilation technology have the same function and different implementation structures, and form a software version pool as heterogeneous functional equivalents. The attack paths for software versions subjected to random and diversified compilation also have random and diverse features. For example, when different network elements load software versions with different compilation versions, dynamic deployment scheduling and management based on a security policy can implement temporal and spatial dimension mimic transformation to transform an unknown security problem and a deterministic attack result caused by a backdoor or a vulnerability in a single cyberspace into a probability problem in a multi-dimensional cyberspace, so that the probability of being attacked can be reduced.

Example 3

An embodiment of the present disclosure provides a security protection apparatus, including:
 a memory, a processor and a security protection program which is stored on the memory and is able to be executed by the processor, and the security protection program, when being executed by the processor, implements operations of the security protection method described in the first embodiment.

Example 4

An embodiment of the present disclosure provides a computer readable storage medium. A security protection program is stored on the computer readable storage medium, and the security protection program, when being executed by a processor, implements operations of the security protection method described in the first embodiment.

The security protection method of the embodiments of the present disclosure is further explained below by using some examples.

First Example

Figure 3:
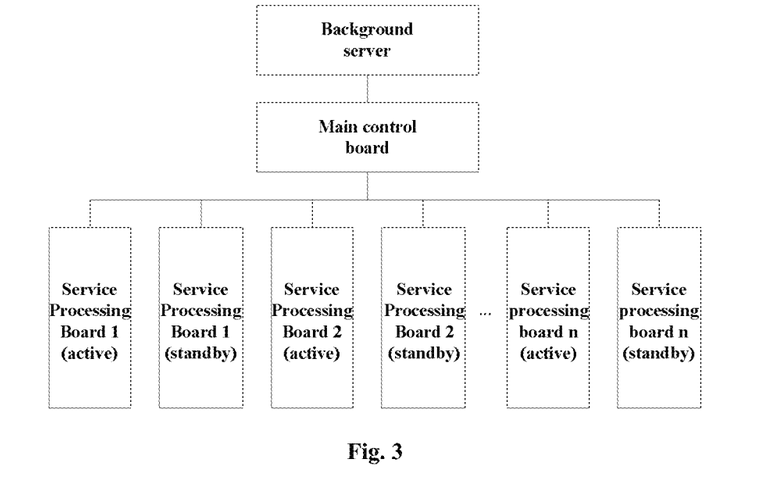
FIG. 3 is a structural diagram of a communication system according to a first example of the present disclosure.

As shown in FIG. 3, a typical communication system may include a background server, a main control board and one or more service boards. The background server may store the software version of each service board. The main control board is mainly responsible for extracting software versions from the background server and distributing the software versions to each service single board according to the slot number of the service single board. The service boards of the communication system may be generally configured in an active/standby mode. In this example, a software version manager is added in the background server of the communication system. When the system is initialized, a software version pool is pre-installed in the software version manager.

The software version pool includes a plurality of software versions, and these software versions are generated based on the diversity compilation technology, including: different software versions generated based on the homologous code through diversity compilation, and different software versions generated based on the heterologous code through diversity compilation. These different software versions (V1, V2, V3 . . . Vn) constitute heterogeneous functional equivalents required by the principles of mimic security defense. The software versions in the software version pool are added with a heterogeneous functional equivalent version management attribute. The heterogeneous functional equivalent version management attribute includes a software function version attribute and a diversity compilation version attribute. Software versions having different heterogeneous functional equivalent version management attributes are marked by different version numbers.

This example provides a security protection method, which may include the following operations.

In operation S101, when the system is initialized, a software version pool is pre-installed in a software version manager of a background server.

The software versions in the software version pool are different software versions generated based on the homologous or heterologous code through diversity compilation.

In operation S102, when the network element is initially generated, the main control board downloads software versions from the software version manager and distributes the software versions to the corresponding service single boards.

The software version manager selects a version Vm from the software version pool (V1, V2, V3 . . . Vn) randomly or based on the security policy, and the service board (network element) loads and runs the software version. The software version manager records the correspondence between the version number Vm and the network element identifier. The network element identifier may be an IP address of the network element, a host identifier of the network element, or a logical identifier of the network element.

In operation S103, during the stable running of the system, the software version of the network element is automatically changed according to the time or based on the security policy.

The software version is selected from the software version pool randomly or based on the security policy. The software version manager records the correspondence between the version number after the change and the network element identifier.

In the active and standby device scenarios, the software version replacement process may include the following operations: the active device runs the software version Vj, the standby device downloads the software version Vi from the software version manager, and the version Vi is different from the running version Vj in the active device. The standby device loads and runs the version Vi, and synchronizes the state data from the active device. In the case that there is a difference in the state data of the heterogeneous functional equivalents Vi and Vj, the Vi version should include a state data conversion module, which is used for completing the state data format and semantic conversion between different software versions Vi and Vj. After receiving the active/standby switching instruction, the standby device switches to act as an active device, and the software version Vi is responsible for service processing. The original active device switches to act as a standby device, the standby device after the switch downloads the software version Vi from the software version manager, synchronizes state data of the active device after the switch, and maintains the running state as the standby device.

Second Example

Figure 4:
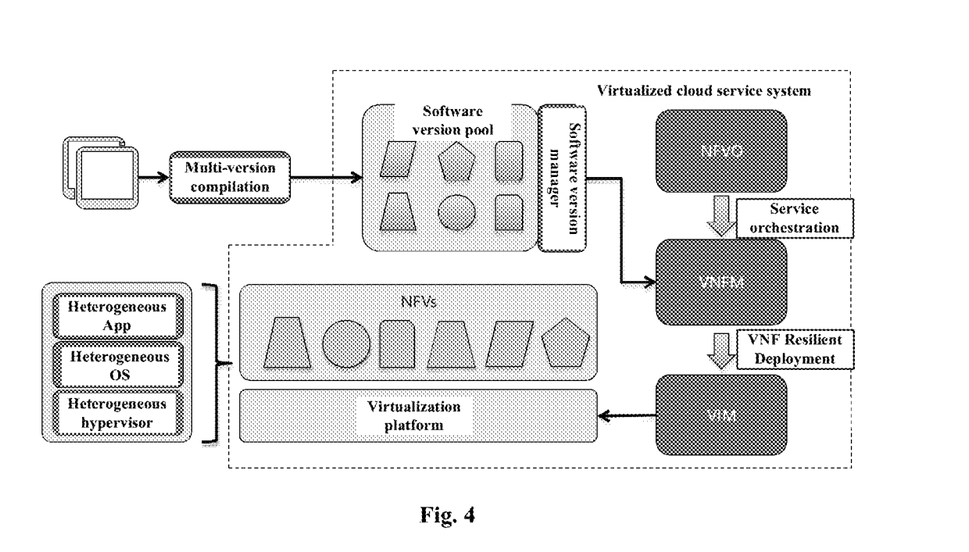
FIG. 4 is a structural diagram of a virtualized cloud service system in a second example of the present disclosure.

As shown in FIG. 4, the virtualized cloud service system described in this example mainly includes: NFVO (Network Functions Virtualization Orchestrator), VNFM (Virtualized Network Function Manager), VIM (Virtualized Infrastructure Manager), NFV (Network Functions Virtualization), virtualization platform, and software version manager. According to service requirements, the NFVO is mainly responsible for orchestration of the NFV, the VNFM is mainly responsible for management and automated deployment of the NFV, and the NFV runs on the virtualization platform in the form of software.

Figure 5:
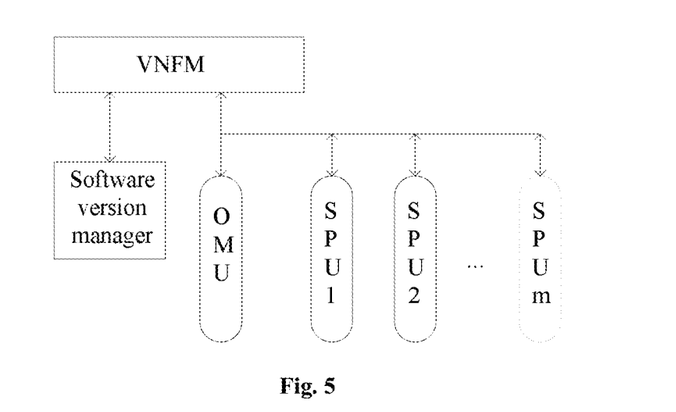
FIG. 5 is a schematic diagram of an elastic scaling scheduling apparatus for a heterogeneous functional equivalent body in a second example of the present disclosure.

FIG. 5 is a schematic diagram of an elastic scaling scheduling apparatus of a heterogeneous functional equivalent in a virtualized cloud service system. The scheduling apparatus includes a software version manager, a VNFM (containing a security policy manager), an OMU (Operation Maintenance Unit) and an SPU (Service Processing Unit). The OMU and the SPU are hardware platform resources running on the NFV, the OMU is responsible for system management of a virtualized network function.

In a virtualized cloud service system, elastic scaling is an important system function, and the elastic scaling function requires that the resources occupied by the virtualized service network element can be scaled according to the size of the traffic volume. In this example, the virtualized service network element is used as a granularity to perform elastic scaling. The elastic scaling is performed based on the current traffic volume and service policy. The automatic elastic scaling policy may be: when the load recorded by the OMU reaches a set threshold, and the load of each SPU of other service processing units reaches a set threshold, a new virtual machine is requested from the virtual network function manager (VNFM).

Figure 6:
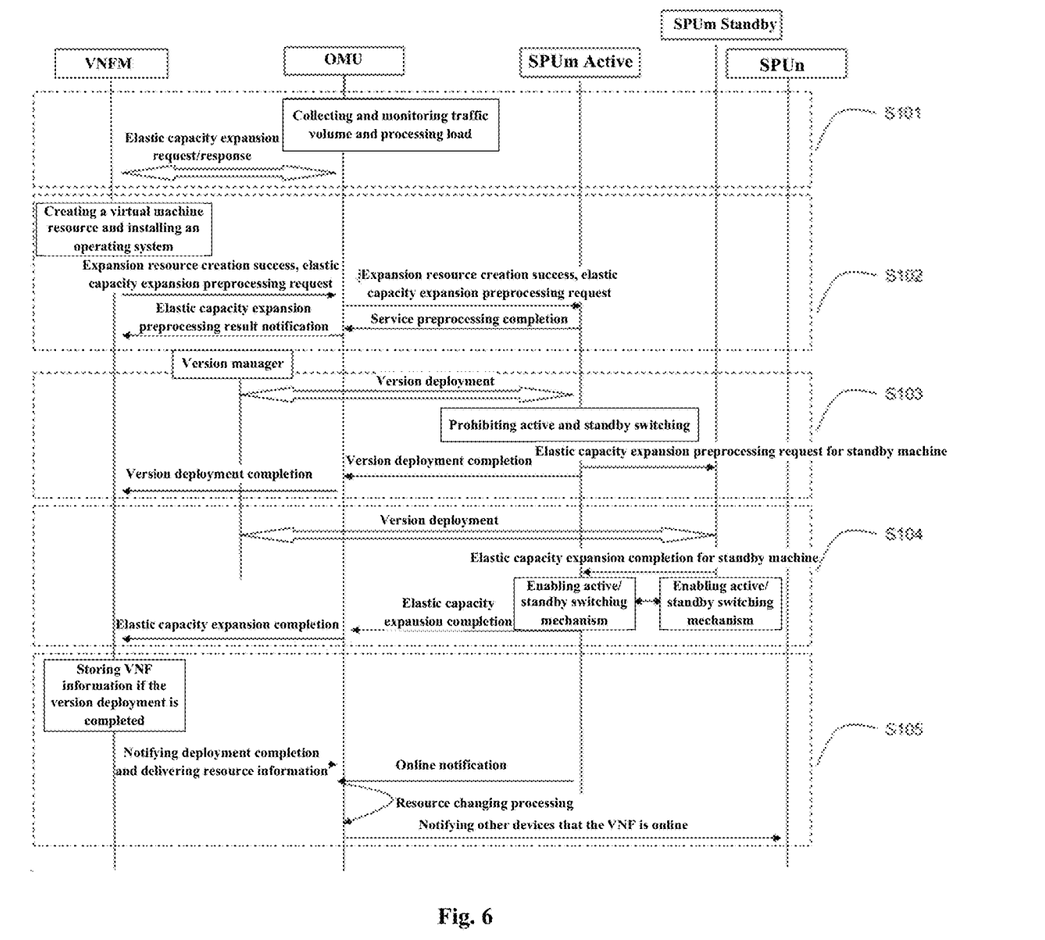
FIG. 6 is a flowchart of a security protection method in an elastic capacity expansion scenario in a second example.

As shown in FIG. 6, in an elastic capacity expansion scenario, a security protection method may include the following operations.

In operation S101, during runtime, OMU collects information such as processing load of SPU1, SPU2, . . . , SPUn. According to conditions such as traffic volume and processing load, if the OMU determines that the condition of elastic capacity expansion is satisfied, the elastic capacity expansion process is started.

In operation S102, VNFM creates new virtual machine active/standby resources (SPUm), and installs an operating system and system management software. The VNFM notifies the OMU and the SPUm to perform elastic capacity expansion preprocessing. The OMU and the SPUm execute elastic capacity expansion preprocessing, including operations such as system hardware resource allocation, active and standby settings, data area initialization, etc. After the virtual machine resource application is successful, a communication relationship is established between the SPUm, the OMU and the VNFM, and the active SPUm for service running is in a state that a software version is to be installed.

In operation S103, the active SPUm and the software version manager start a version deployment process. The software version manager selects a version Vm from the software version pool (V1, V2, V3 . . . Vn) randomly. Alternatively, the software version manager selects a version Vm from the software version pool (V1, V2, V3 . . . Vn) based on the security policy. The OMU downloads the software version Vm from the software version manager to the active SPUm for running. The active SPUm is configured to prohibit the active/standby switching and notify the standby SPUm of elastic capacity expansion. The active SPUm is started successfully, and notifies the OMU that the version deployment is completed, and the OMU updates the SPUm state recorded in the storage area. The OMU notifies the VNFM of the version deployment completion, and the VNFM updates the VNF (corresponding to the SPUm) state recorded in the storage area. A software version manager stores a software version mapping table which records a correspondence between a software version number and a network element identifier. The network element identifier may be an IP address of the network element, a host identifier of the network element, or a logical identifier of the network element.

In operation S104, the standby machine SPUm queries the software version mapping table through the software version manager to obtain version number information of Vm. The standby device SPUm downloads the software version Vm from the software version manager and loads and runs this software version. The standby SPUm is started successfully. The standby device SPUm notifies the active device SPUm that the elastic capacity expansion succeeds. The active SPUm receives the "flexible capacity expansion success" message from the standby SPUm, and notifies the standby SPUm to disable the active and standby switching. The standby device SPUm receives the active/standby switching disabling command and sends acknowledgement to the active device SPUm. The active SPUm receives the notification, and the elastic capacity expansion of the active SPUm ends.

In operation S105, the VNFM receives an elastic capacity expansion success message of the VNF (corresponding to the SPUm), and stores VNF information, such as a service type, performance, load, etc., in the local storage area. The VNFM notifies the OMU that the deployment is completed, and delivers resource information such as network bandwidth. After receiving the message, the OMU delivers an online notification to the SPUm, and the OMU completes the resource change processing. The OMU notifies other SPUs that a new VNF (corresponding to the SPUm) is online, and the other SPUs complete corresponding processing according to a preset policy.

In an elastic contraction scenario, a security protection method may include the following operations.

In operation S201, during runtime, OMU collects information such as processing load of SPU1, SPU2, . . . , SPUn. According to conditions such as traffic volume and processing load, if the OMU determines that the elastic contraction condition is satisfied, the elastic contraction process is started.

In operation S202, the OMU notifies the active SPUm to start the elastic contraction process. The active SPUm prohibits active/standby switching, and starts to migrate the ongoing service connection to other SPUs according to the preset policy.

In operation S203, after the service connection migration in the active SPUm is completed, the active SPUm requests the VNFM to delete the virtual machine, and requests the software version manager to deregister the used version number Vm. The software version manager deletes the Vm entry in the software version mapping table and responds to the OMU, and the SPUm elastic contraction ends. After receiving the response message, the OMU deletes the SPUm-related information and releases the SPUm resource, where the SPUm resource includes an SPUm active device resource and an SPUm standby device resource.

In operation S204, the OMU notifies the VNFM to delete the corresponding VNF information.

In operation S205, the VNFM receives the notification message of the OMU, and deletes the corresponding VNF information.

It should be noted that, the present disclosure can also have various other embodiments, and various corresponding changes and modifications can be made by those skilled in the art according to the present disclosure without departing from the essence of the present disclosure, but these corresponding changes and modifications shall belong to the scope of protection defined by the appended claims of the present disclosure.

INDUSTRIAL APPLICABILITY

The embodiments of the present disclosure are applicable to the technical field of computer communications, and can use software versions generated by diversity compilation as heterogeneous functional equivalents and dynamically deploy a software version of a scheduling and management network element, thereby implementing active protection independent of attack features in the system.

What is claimed is:

1. A security protection method, comprising:
    generating software versions based on diversity compilation, and constructing a software version pool using the software versions as heterogeneous functional equivalents; and
    dynamically deploying a software version on a network element according to the software version pool,
    wherein dynamically deploying the software version on the network element according to the software version pool further comprises:
    during system operation, migrating services from a first network element to a second network element according to a security policy, deploying a first software version in the software version pool on the first network element, and deploying a second software version in the software version pool on the second network element, wherein the first software version and the second software version correspond to a same software function but different compiled versions.

2. The method as claimed in claim 1, wherein
    the software versions in the software version pool comprise the following version attributes: a software function version attribute and a diversity compilation version attribute, wherein the software function version attribute is used to mark a logical function difference between software versions, and the diversity compilation version attribute is used to mark a difference in results of the diversity compilation.

3. The method as claimed in claim 2, further comprising:
    establishing a software version mapping table, wherein the software version mapping table records a correspondence between version attributes of each software version used as a heterogeneous functional equivalent and a network element on which the software version is deployed.

4. The method as claimed in claim 1, wherein dynamically deploying the software version on the network element according to the software version pool further comprises:
    when the network element is initially generated, selecting one software version from the software version pool randomly or based on a security policy, and deploying the selected software version onto a physical resource of the network element.

5. The method according to claim 1, wherein dynamically deploying the software version on the network element according to the software version pool further comprises:
    when the network element is subjected to elastic capacity expansion, selecting one software version from the software version pool randomly or based on a security policy, and deploying the selected software version onto the capacity-expended physical resource of the network element.

6. A security protection apparatus, a hardware processor, configured to execute program modules stored on a memory, wherein the program modules comprising:
    a software version pool establishment module, configured to generate software versions based on diversity compilation, and construct a software version pool using the software versions as heterogeneous functional equivalents; and
    a software version deployment module, configured to dynamically deploy a software version on a network element according to the software version pool, wherein the software version deployment module is further configured to, during system operation, migrate services from a first network element to a second network element according to a security policy, deploy a first software version in the software version pool on the first network element, and deploy a second software version in the software version pool on the second network element, wherein the first software version and the second software version correspond to a same software function but different compiled versions.

7. The apparatus as claimed in claim 6, wherein
the software versions in the software version pool comprise the following version attributes: a software function version attribute and a diversity compilation version attribute, wherein the software function version attribute is used to mark a logical function difference between software versions, and the diversity compilation version attribute is used to mark a difference in results of the diversity compilation.

8. The apparatus as claimed in claim 7, wherein
the software version pool establishment module is further configured to establish a software version mapping table, wherein the software version mapping table records a correspondence between version attributes of each software version used as a heterogeneous functional equivalent and a network element on which the software version is deployed.

9. The apparatus as claimed in claim 6, wherein
the software version deployment module is configured to dynamically deploy the software version on the network element according to the software version pool in a following manner: when the network element is initially generated, selecting one software version from the software version pool randomly or based on a security policy, and deploying the selected software version onto a physical resource of the network element.

10. The apparatus as claimed in claim 6, wherein
the software version deployment module is further configured to dynamically deploy the software version on the network element according to the software version pool in a following manner: when the network element is subjected to elastic capacity expansion, selecting one software version from the software version pool randomly or based on a security policy, and deploying the selected software version onto the capacity-expended physical resource of the network element.

11. A security protection apparatus, a hardware processor, configured to execute program modules stored on a memory, wherein the program modules comprising:
a memory, a processor and a security protection program which is stored on the memory and is able to be executed by the processor, and the security protection program, when being executed by the processor, implements operations of the security protection method as claimed in claim 1.

12. A non-transitory computer readable storage medium, wherein a security protection program is stored on the computer readable storage medium, and the security protection program, when being executed by a processor, implements operations of the security protection method as claimed in claim 1.

13. The method as claimed in claim 2, wherein dynamically deploying the software version on the network element according to the software version pool comprises:
when the network element is initially generated, selecting one software version from the software version pool randomly or based on a security policy, and deploying the selected software version onto a physical resource of the network element.

14. The method as claimed in claim 3, wherein dynamically deploying the software version on the network element according to the software version pool comprises:
when the network element is initially generated, selecting one software version from the software version pool randomly or based on a security policy, and deploying the selected software version onto a physical resource of the network element.

15. The method according to claim 4, wherein dynamically deploying the software version on the network element according to the software version pool further comprises:
during system operation, changing the software version on the network element periodically or according to the security policy, wherein the software version after the change is selected from the software version pool randomly or selected from the software version pool based on the security policy, and the software version before the change and the software version after the change correspond to the same software function but different compiled versions.

16. The apparatus as claimed in claim 7, wherein
the software version deployment module is configured to dynamically deploy the software version on the network element according to the software version pool in a following manner: when the network element is initially generated, selecting one software version from the software version pool randomly or based on a security policy, and deploying the selected software version onto a physical resource of the network element.

17. The apparatus as claimed in claim 8, wherein
the software version deployment module is configured to dynamically deploy the software version on the network element according to the software version pool in a following manner: when the network element is initially generated, selecting one software version from the software version pool randomly or based on a security policy, and deploying the selected software version onto a physical resource of the network element.

18. The apparatus as claimed in claim 9, wherein
the software version deployment module is further configured to dynamically deploy the software version on the network element according to the software version pool in a following manner: during system operation, changing the software version on the network element periodically or according to the security policy, wherein the software version after the change is selected from the software version pool randomly or based on the security policy, and the software version before the change and the software version after the change correspond to the same software function but different compiled versions.

* * * * *